United States Patent [19]
Hassall et al.

[11] Patent Number: 5,473,406
[45] Date of Patent: Dec. 5, 1995

[54] APPARATUS AND METHODS FOR ASSEMBLING DEPTH IMAGE SYSTEMS

[75] Inventors: Stephen J. Hassall, Churchville; Daniel R. May, West Henrietta; Martin E. Oehlbeck, Rochester, all of N.Y.

[73] Assignee: Eastman Kodak Company, Rochester, N.Y.

[21] Appl. No.: 278,436

[22] Filed: Jul. 21, 1994

[51] Int. Cl.6 .......................... G03B 27/32; G03B 35/14
[52] U.S. Cl. .................... 355/22; 355/33; 355/46; 355/85; 250/491.1; 156/364; 156/379; 156/556
[58] Field of Search .................... 355/22, 33, 46, 355/85; 354/115; 250/491.1; 156/364, 379, 379.6, 379.8, 380.9, 556, 563

[56] References Cited

U.S. PATENT DOCUMENTS

| | | | |
|---|---|---|---|
| 2,815,310 | 12/1957 | Anderson | 154/122 |
| 3,462,226 | 8/1969 | Huffaker | 356/72 |
| 4,220,491 | 9/1980 | Metcalf et al. | 156/285 |
| 4,387,000 | 6/1983 | Tancredi | 156/495 |
| 4,478,639 | 10/1984 | Smith et al. | 430/9 |
| 4,588,899 | 5/1986 | Erhardt | 250/491.1 |
| 4,661,191 | 4/1987 | Kamio et al. | 156/275.5 |
| 5,259,169 | 11/1993 | Applebaum et al. | 156/379.8 |
| 5,276,478 | 1/1994 | Morton | 355/22 |
| 5,278,608 | 1/1994 | Taylor et al. | 355/22 |
| 5,285,238 | 2/1994 | Quadracci et al. | 355/22 |
| 5,347,3541 | 9/1994 | Powers et al. | 355/91 |

Primary Examiner—Michael L. Gellner
Assistant Examiner—D. P. Malley
Attorney, Agent, or Firm—Charles E. Snee, III

[57] ABSTRACT

An image sheet (12) is coated with a radiation-curable adhesive (48) at a coating station and then laminated to a lenticular array sheet (20) at a laminating station (50). A lamination of the image and array sheets is then positioned on an aligning station (56) where the lenticules of the array sheet are aligned with the image lines (16) of the image sheet. The adhesive is set at a curing station (60).

17 Claims, 12 Drawing Sheets

APPARATUS AND METHODS FOR ASSEMBLING DEPTH IMAGE SYSTEMS

DESCRIPTION

1. Technical Field

The invention concerns apparatus and methods for manufacturing images which provide a visual impression of three-dimensional depth. More particularly, the invention is related to a method of laminating a lineiform image sheet to a lenticular array sheet using a radiation-curable adhesive and to an apparatus and method for aligning the array sheet to the lineiform image and then curing the adhesive.

2. Background Art

Lenticular arrays or sheets are a known memos for giving certain images the appearance of depth. Images are created which comprise an array of parallel image lines which form a composite picture or lineiform image of a scene viewed from different angles. A lenticular sheet comprising an at ray of contiguous, parallel, elongated lenticules is positioned in front of the lineiform image, so that the lenticules cause each eye of the viewer to see different elements or views of the overall image. Thus, the viewer will interpret the result as depth of field. Depth images of this type have been created by exposing a photographic film through a lenticular array sheet and then developing the latent image. If the lenticular array is bonded to the photographic medium before exposure, then the lineiform image and the array are automatically aligned. These types of images generally are not of high three-dimensional quality and do not lend themselves to electronic image manipulation before the print is finalized.

Commonly assigned U.S. Pat. No. 5,276,478 describes an improved apparatus and methods for making depth in which the lineiform image is formed electronically, the spacing between image lines being controlled to provide improved alignment with the lenticules of a lenticular array sheet. FIG. 1 of the present specification illustrates schematically a depth image system 10 of the type made in accordance with the patent. A recorded image sheet or medium 12 bears a lineiform image suitable for viewing by either transmitted or reflected light. Sets 14 of image lines 16 are produced optically or electronically to provide the composite lineiform image. Image sheet 12 typically is rather thin and quite flexible but may be stiff or rigid. A very thin layer of adhesive 18, typically a contact adhesive provided on the back side of a lenticular array sheet 20 or on the surface of the image sheet, joins the image and array sheets at their smooth, interfaced surfaces. Array sheet 20 may be made from a suitable flexible plastic and typically has a thickness of about 0.050 inch (1.27 mm). For best effect, the parallel lenticules 22 of the array sheet must be positioned with one lenticule for each set 14. When viewed, one image line 16 of each set 14 is viewed by each eye 24, 26 of the observer, so that the observed lines merge to create a complete scene with perceived depth of field. The eyes 24, 26 see the image via light rays 28 to 38 through lenticules 22, as a series of simultaneous image lines or view slices. Eye 24 sees image lines via rays 28–32 and combines the lines into a composite, single first view. Simultaneously, eye 26 sees image lines via rays 34–38 and combines the lines into a composite, single second view. The scenes provided by the first and second views provide the depth perspective.

While such depth image systems are capable of displaying images with striking appearances of three dimensions, efficiency of production and the quality of the image seen by the observer are dependent greatly on defect-free lamination of the image and array sheets and on quick, accurate alignment of the image lines and the lenticules. When contact or pressure sensitive adhesive is used between the two sheets, achieving accurate alignment can be quite difficult, particularly for rather large images. Other adhesives such as hot melts, two-part epoxies and heat-reactive adhesives have been used with mixed success. Such adhesives often are too viscous or bond instantly on contact and prevent the sheets from being properly laminated and accurately aligned. Some adhesives cure too slowly for efficient production use. Variations in the thickness of the adhesive layer also have led to dimensional distortions and poor alignment between the image sheet and the lenticular sheet. Some adhesives impart heat or stress to the sheets which can cause permanent distortion of the viewed image. Regardless of the type of adhesive used, bubbles of air can become trapped between the sheets during lamination, thus leading to defects in the final image. Variations in thickness of the array sheets can contribute to entrapment of air between the sheets during lamination, since the array sheet may not fully contact the image sheet in the lamination nip. Also, providing and maintaining correct alignment of the sheets during curing of the adhesive has been difficult to accomplish using known techniques for assembling depth images.

SUMMARY OF THE INVENTION

Our invention is defined by the claims. One embodiment of our laminating method is particularly useful for laminating a depth image from an image sheet bearing a lineiform image and having a first, leading edge; a lenticular array sheet, the array sheet having lenticules parallel to the lineiform image and the array sheet having a second, leading edge; and a layer of adhesive between the image and array sheets. improved lamination is achieved by first applying a layer of the adhesive to either the image bearing or photographic emulsion side of the image sheet or the surface of the array sheet opposite the lenticules. Then, using a laminator comprising a pair of laminating rolls having a nip between the rolls, the leading edge of the array sheet is placed between the rolls. The leading edge of the image sheet then is inserted into the nip behind the leading edge of the array sheet and the laminating rolls are rotated to draw both the array and image sheets into the nip. Uniquely in accordance with the invention, simultaneously with the rotating step, the array sheet is flexed away from the image sheet at the nip and into contact with the roll on the same side of the nip as the array sheet, so that the surface of the array sheet facing the image sheet deforms to ensure full contact with the image sheet in the nip and to prevent air from being entrapped between the sheets as the sheets are drawn into the nip. The transverse geometrical elements of the surface of the array sheet facing the image sheet tend to straighten as the sheet wraps onto the roll, even in array sheets exhibiting thickness variations as great as 35% per lineal inch (1.38% per lineal mm), thus ensuring full contact between the sheets as the sheets move into the nip.

The array sheet may have a larger size than the image sheet, whereby the array sheet extends peripherally beyond the image sheet, to minimize invasion of air between the sheets after laminating. After the rotating and flexing steps, the array sheet may be trimmed to a size equal to that of the image sheet. The array sheet typically is rather thick and difficult to insert between the rolls if the nip is closed. So, our laminating method, prior to the placing step, also may include steps of opening the nip to admit the leading edge of the array sheet; positioning the leading edge of the array sheet just beyond the area of contact between the rolls if the nip were closed; and after the placing and positioning steps and before inserting the leading edge of the image sheet, closing the nip to grip the leading edge of the array sheet.

One embodiment of our aligning apparatus is particularly useful for assembling a depth image of the type described. A vacuum platen supports the image sheet, the platen having a first surface with a pattern of openings, the pattern having a geometry such that at least one edge of the image sheet extends beyond the pattern when the image sheet is supported on the vacuum platen. This free edge of the image sheet thus is to flex with the array sheet, without delaminating, when a means for gripping moves at least one edge of the array sheet. Means are included for applying vacuum through the pattern to hold the image sheet on the first surface. Means are mounted next to the vacuum platen for gripping at least one edge of the array sheet and moving the array sheet relative to the image sheet to align the lenticular array with the lineiform image. The means for gripping and moving may comprise means for gripping at least one edge of the array sheet; a frame member supporting the means for gripping; and means for moving the frame member to reposition the array sheet until the lenticules are in alignment with the lineiform image. Finally, once alignment has been achieved, the means are provided for curing the adhesive to ensure permanent alignment of the array and image. The adhesive may be curable by ultraviolet light, so that the means for curing comprises a source of ultraviolet light. The ultraviolet light may be directed through the array sheet or may be transmitted through the image sheet. The source of ultraviolet light may have a longitudinal axis essentially parallel to the lenticules, and the apparatus may include means for moving the vacuum platen and the means for gripping past the ultraviolet light source. The means for curing alternatively may comprise an electron beam source.

Our method for assembling such a depth image may comprise the steps of providing a vacuum platen for supporting the laminated image and array sheets, the platen having a first surface with a pattern of openings; placing the image sheet on the vacuum platen with at least one edge of the image sheet extended beyond the pattern; applying vacuum through the pattern to hold the image sheet on the vacuum platen; gripping at least one edge of the array sheet and moving the array sheet relative to the image sheet to align the lenticular array with the lineiform image; and curing the adhesive following alignment of the array and image. The curing may be completed using a source of ultraviolet light directed through the image sheet or the array sheet. Alternatively, an electron beam source may be used. Preferably, the source of ultraviolet light has a longitudinal axis essentially parallel to the lenticules and the vacuum platen is moved past the ultraviolet light source while holding the image sheet and gripping the array sheet.

Our invention provides numerous advantages. Variations in the thickness of the array sheet are accommodated during laminating to avoid entrapment of air. A smooth, bubbleless lamination is produced. Both transparent and reflective images may be aligned to lenticular arrays. The alignment of the image and array sheets is completed accurately and easily, without slow, unreliable manual intervention. Since the edges of the array sheet are gripped during alignment, the image lines are not distorted as alignment proceeds. Similarly, the uniformity and thickness of the adhesive layer are not distorted during alignment. Alignment is completed without causing delamination of the image and array sheets. The alignment of the image and array sheets is maintained during curing, thus preventing loss of alignment due to creep, for example.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
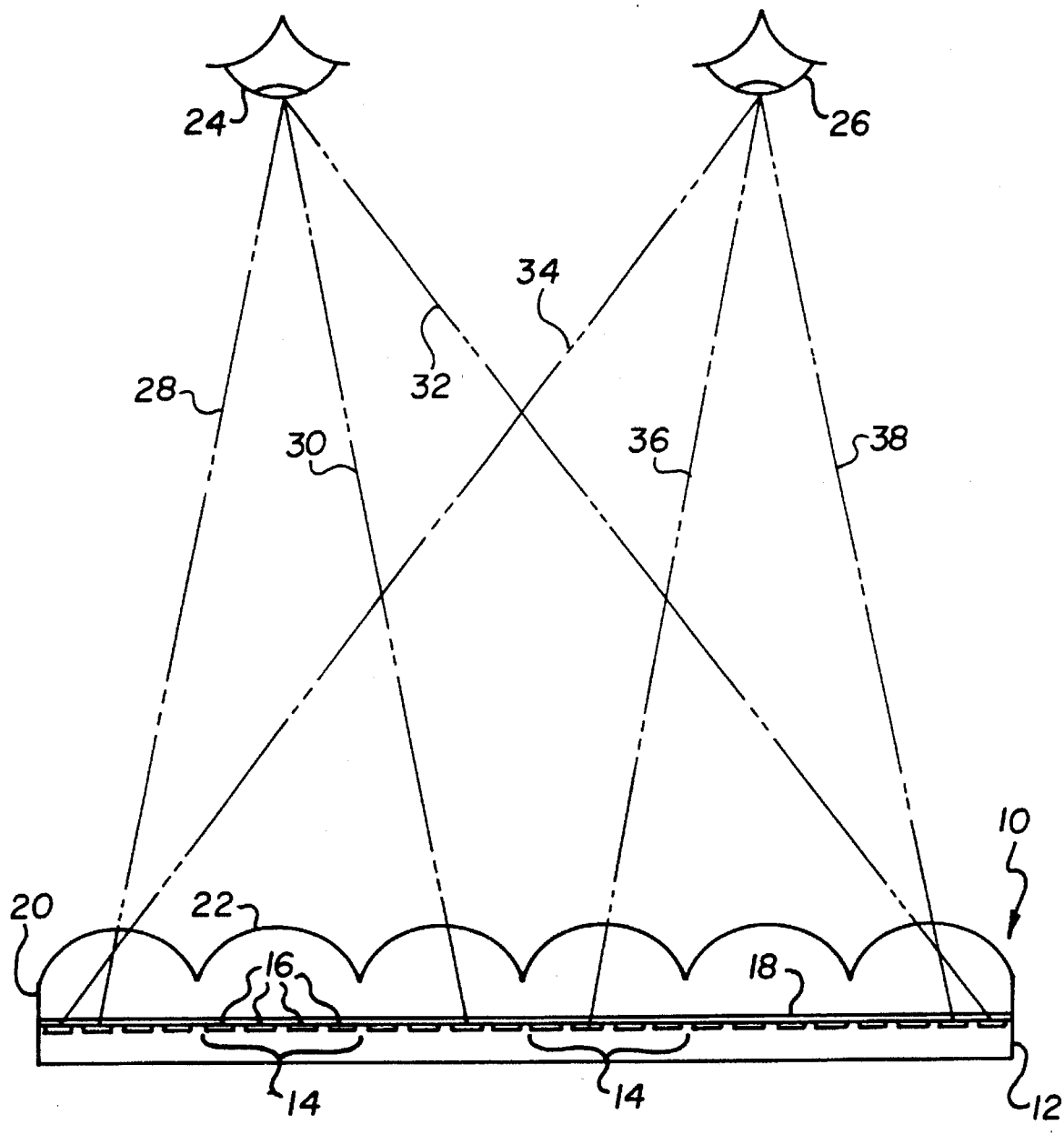
FIG. 1 illustrates schematically a prior art depth in, age system of the general type suitable for manufacture in accordance with our invention.

The following is a detailed description of the preferred embodiments of our invention, reference being made to the drawings in which the stone reference numerals identify the same elements of structure in each of the several Figures.

Figure 2:
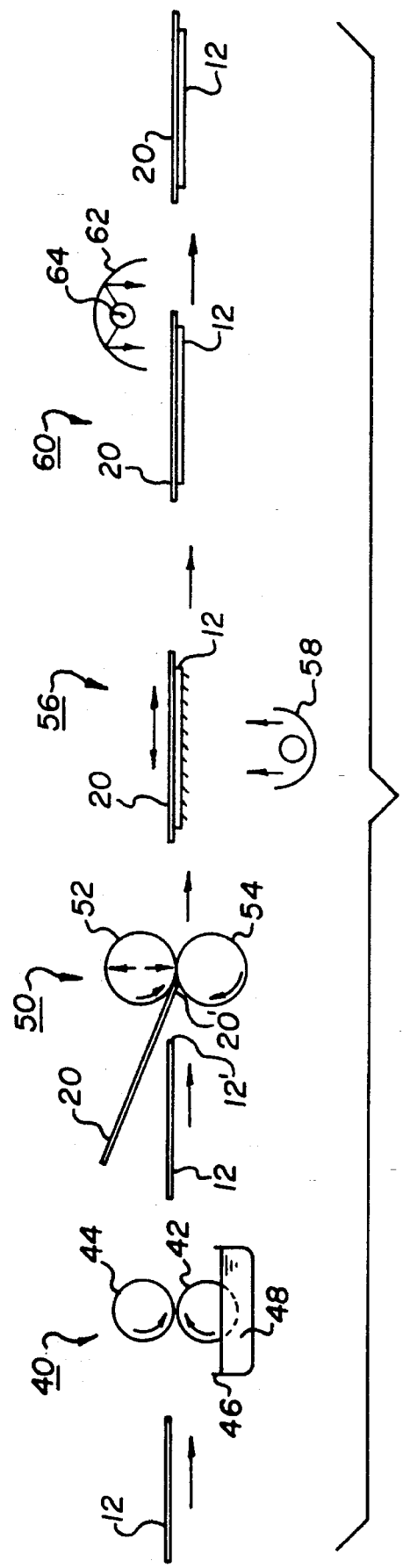
FIG. 2 illustrates schematically the lamination and alignment methods of our invention.

FIG. 2 illustrates schematically the overall laminating and aligning methods of our invention. Image sheet 12 is presented to a conventional gravure coating station 40 to be coated with a suitable adhesive curable by ultraviolet light or electron beam. The emulsion side bearing image lines 16 is to be coated, preferably edge to edge. In the familiar manner, coating station 40 comprises a lower, gravure roll 42 and an upper, pressure roll 44. Gravure roll 42 is immersed partially in a pan 46 which contains a supply of adhesive 48. Gravure roll 42 may be provided with a laser scribed pattern to acquire a sufficient amount of adhesive 48 to apply a layer 3 to 30 microns thick to image sheet 12 when the sheet is passed between rolls 42, 44. Other engraving techniques also may be used for roll 42. The overall structure and operation of such a gravure coating apparatus are familiar to those skilled in time an and comprise no part of our invention. Other coating methods also may be used, such as bead or curtain coating.

To facilitate lamination and alignment of image sheet 12 and array sheet 20, adhesive 48 preferably has a viscosity in the range of 100 to 3,000 centipoise, most preferably in the range of 1,500 to 2,300 centipoise. Array sheet 20 may be an extrusion made, for example, from acrylic plastic and may have a thickness of about 0.050 inch (1.27 mm). A suitable adhesive 48 must be compatible with the material of array sheet 20 and the photographic emulsions of image sheet 12. One such adhesive is curable by ultraviolet light and comprises a mixture of 30 to 70 parts, preferably 45 to 55 parts and most preferably 50 parts, of a non-yellowing, aliphatic urethane acrylate resin; 15 to 45 parts, preferably 25 to 35 parts and most preferably 27.5 parts of a beta-carboxyethyl acrylate; 10 to 40 parts, preferably 20 to 30 parts and most preferably 22.5 parts of tetrahydrofurfuryl acrylate; and 2 to 10 parts per hundred, preferably 3 to 5 parts per hundred and most preferably 4 parts per hundred of a photoinitiator such as commercially available Darocure 1173 made by Ciba-Geigy Corporation of Hawthorne, N.Y. The urethane acrylate resin may be commercially available product CN966H90 made by Sanomer Company, Inc. of Exton, Pa. The composition of this adhesive is a separate invention of our colleague Billy R. Dotson, which may be used in accordance with our invention. Other adhesives curable by ultraviolet light also may be used. This adhesive also may be cured by application of an electron beam from an electron beam source.

After coating at station 40, image sheet 12 is presented, coated side upward, to a laminating station 50. Both to ensure proper edge bonding between the image sheet and the array sheet and to enable the edges of the array sheet to be gripped during alignment without delaminating from the image sheet, array sheet 20 preferably extends about 0.5 inch (12.7 mm) in all directions beyond image sheet 12, as illustrated schematically. See also FIG. 16. As will be discussed in greater detail regarding FIGS. 3 to 5, the leading edge 20' of array sheet 20 is positioned in the nip between a movable roll 52 and a fixed roll 54, with sheet 20 wrapped partially onto roll 52. The leading edge 12' of image sheet 12 is then tucked into the nip beneath array sheet 20 and rolls 52, 54 are rotated to laminate the sheets to each other. The laminated sheets 12, 20 are then moved to an aligning station 56 where a source 58 passes visible light through both sheets to enable an operator to see whether the lenticules are aligned with the image lines. Alternatively, if image sheet 12 is opaque, light may be directed through array sheet 20 and reflected from the image sheet. The apparatus of our invention shown in FIGS. 6 to 16 then moves array sheet 20 relative to image sheet 12 until the operator determines by visual observation that proper alignment has been achieved. The aligned, laminated sheets are then translated, while still clamped to prevent loss of alignment, to a curing station 60. A source 62 of ultraviolet light provides a means for curing and has an elongated tube 64 with an axis preferably parallel to lenticules 22. For the adhesive composition previously mentioned, a medium pressure mercury lamp with a power density of 300 watts per inch (11.81 watts per mm) is suitable. An infrared filter preferably is provided between bulb 64 and the laminate. Any residual infrared radiation from source 62 that reaches sheets 12, 20 causes no meaningful distortion. For optimum curing, the lamination is moved past source 62 in a first direction and then moved in the opposite direction to complete the cure. The aligned, cured lamination is then trimmed to remove excess portions of the array sheet. With some conventional radiation-curable adhesives, a visible light source may be used. Source 62 alternatively may be an electron beam source with a beam voltage of at least 150 kV, which directs its bean through the image sheet to provide a dose of 3 to 5 Megarad to cure the adhesive.

Figure 3:
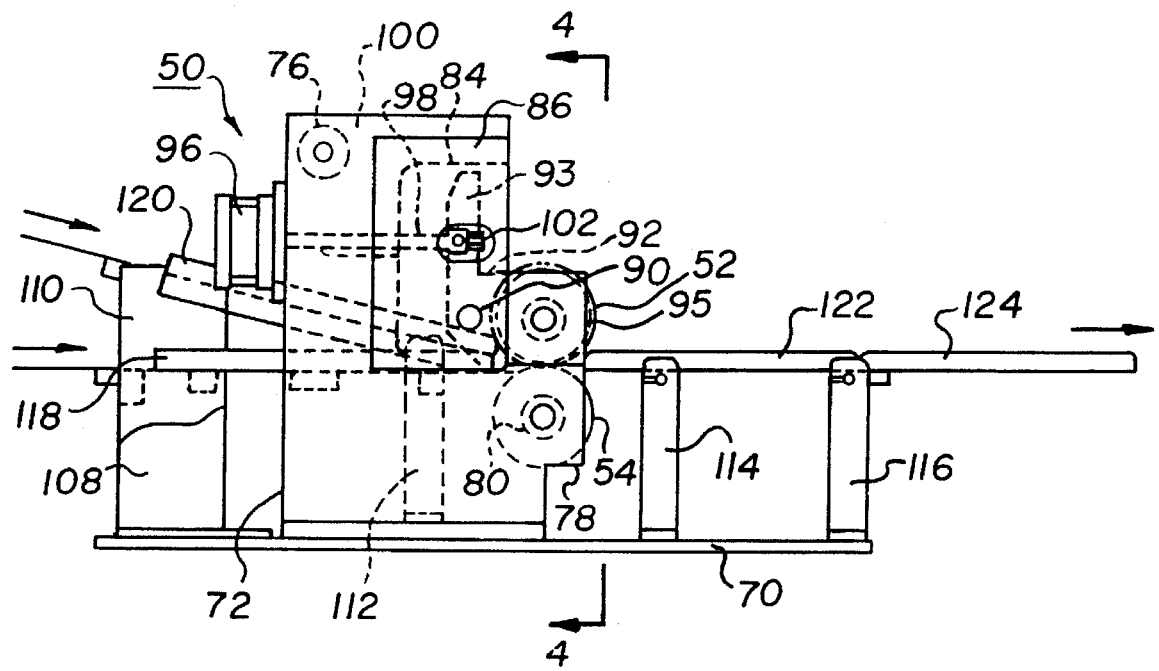
FIG. 3 illustrates an elevation view of a laminating apparatus adapted for use in accordance with our invention.
Figure 4:
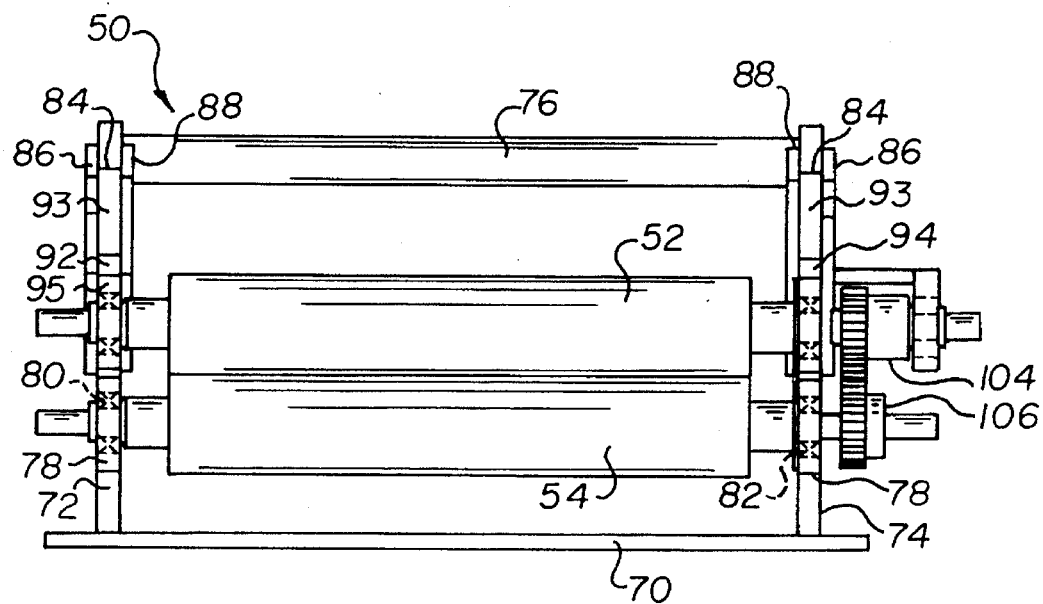
FIG. 4 illustrates a view along line 4—4 of FIG. 3.

FIGS. 3 and 4 illustrate a known type of laminating apparatus suitable for use at station 50 in accordance with our laminating method. A base plate 70 supports a pair of upstanding end plates 72, 74. Between the upper left corners of plates 72, 74, as viewed in FIG. 3, a cross bar 76 is mounted. Just above the lower right corners, flanges 78 project to provide mounting points for a pair of bearings 80, 82 to support fixed roll 54. Above fixed roll 54, a C-shaped notch 84 extends leftward, as shown in phantom lines in FIG. 3. An outboard bearing plate 86 and an inboard bearing plate 88 are bolted on either side of each notch 84 and provide mounting points for a pair of pivot shafts 90. A pair of bell cranks 92, 94, shown in phantom in FIG. 3, are pivotably mounted between the bearing plates, one on each pivot shaft 90. On the left end face of each end plate 72, 74 is mounted a pneumatic cylinder 96 whose actuator rod 98, shown in phantom in FIG. 3, extends through a bore 100 provided within the thickness of the end plate, also as shown in phantom in FIG. 3. The free end of each rod 98 forms a pivot joint 102 with the upwardly extended arm 93 of its associated bell crank 92, 94. Between the horizontally extended arms 95 of the bell cranks, movable roll 52 is rotatably mounted. The separation is fixed between the axes of the rolls when the nip is closed, by appropriate stops engaging arms 95, not illustrated. As shown in FIG. 4, the shafts of rolls 52, 54 extend beyond end plate 74 and bell crank 94 and are fitted with drive pinions 104, 106. Those skilled in the art will appreciate that pinions 104, 106 may be driven by any convenient means to rotate rolls 52, 54.

Figure 5:
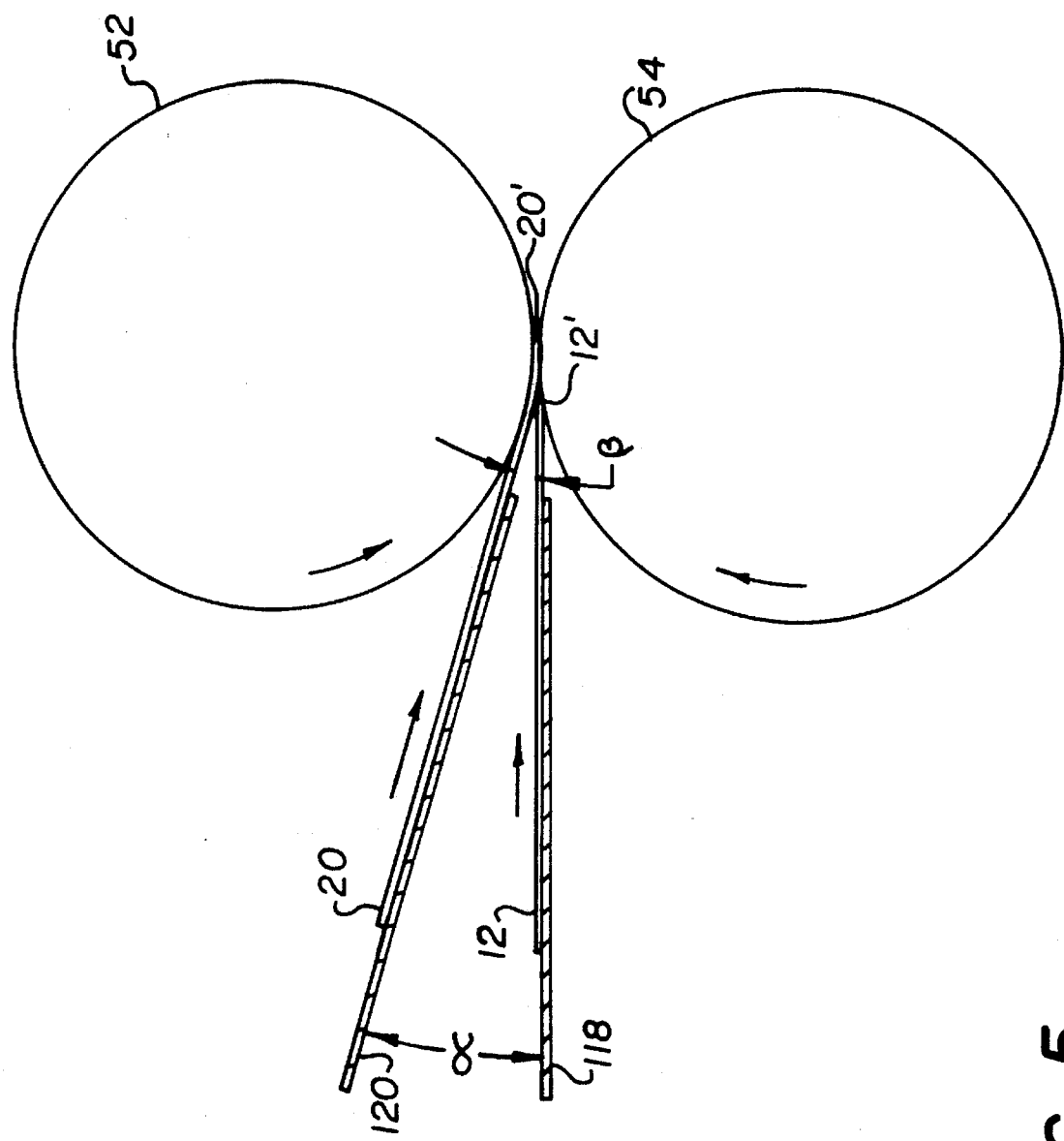
FIG. 5 illustrates schematically sequential feeding of the array sheet and the image sheet into the nip of the laminating rolls.

As seen in FIG. 3, a pair of support plates 108, shown partially broken away, and 110 are mounted to base plate 70. Between end plates 72, 74 and to the left of the rolls as viewed in FIG. 3, a pair of support stands 112 are mounted to base plate 70. To the right of the rolls, further pairs of support stands 114 and 116 are mounted. To direct each image sheet to the nip between rolls 52, 54, an infeed chute 118 is mounted between plates 108, 110 and stand 112, with the surface of chute 118 extended essentially parallel to guide each image sheet directly into the nip. To direct each array sheet to the nip, an infeed chute 120 is mounted between plates 108, 110 and stand 112, with the surface of chute 120 set at an angle α above chute 118, as seen in FIG. 5. When rolls 52, 54 have diameters of about 4.0 inch (102 mm) angle α may be about 15°. An outfeed chute 122 is mounted between stands 114 and 116 to receive the laminated sheets as they pass between the rolls. A further outfeed chute 124 may be cantilevered from stand 116.

The apparatus shown in FIGS. 3 to 5 is particularly useful in accordance with the method of our invention, for laminating an image sheet 12 to an array sheet 20, the two sheets having relatively smooth surfaces at the adhered interface, in such a way that an essentially defect-free adhered interface is produced. Our method can accommodate rather large thickness irregularities in array sheet 20, as much as 35% variation per lineal inch (1.38% per lineal mm). Our method essentially prevents entrapment of air between the sheets which results in virtually 100% bonding between the interface surfaces, with practically no visible defects such as air bubbles in the layer of adhesive.

The primary variables controlling our method are the viscosity of adhesive 18 as coated, the degree of coverage and thickness of the coating of adhesive, the nip angle $\beta$ between the sheets as they enter the nip between the rolls, the diameters of the rolls and their hardness, the choice of fixed or floating gap between the rolls and the speed of rotation of the rolls. As mentioned previously, the viscosity of the adhesive as coated preferably is in the range of 1,500 to 2,300 centipoise. The coverage of the adhesive should be uniform and sufficient in volume to allow a small bead or meniscus of adhesive to form at the nip between the roll. A thickness of 3 to 30 microns is sufficient. The ability to create such a bead depends on factors such as the viscosity of the adhesive, the force of engagement of the rolls, nip angle $\beta$, the hardness of the rolls and the speed of lamination. Lower viscosity and higher nip force generate a bead more easily. A larger nip angle $\beta$ also allows a bead to form more easily and enables entrapped air to escape because of a shorter leakage path back to atmosphere. Relatively small diameter rolls are preferred since they increase nip angle $\beta$.

Preferably, rolls 52, 54 have a hardness in the range of 80 to 90 Shore A durometer, with the hardness being essentially equal for the two rolls. Rolls of unequal hardness will cause a curved path to be formed through the nip since the softer roll will deform itself over the harder roll. Also, a softer roll tends to create a smaller nip angle than that of harder roll having the same nominal diameter, due to the greater distortion of the softer roll as it enters the nip. The more the roll is distorted or flattened as it enters the nip, the more it will reduce the nip angle between the sheets.

During use of the apparatus of FIGS. 3 to 5 in accordance with our method, cylinders 96 are actuated to retract rods 98 and raise roll 52 away from roll 54 to open the nip. An array sheet 20 is then moved down infeed chute 120 until leading edge 20' extends just beyond, approximately 0.25 inch (6.35 mm), the nominal line of contact between the rolls when the nip is closed. The rolls are then closed to the position illustrated in FIG. 5. Sufficient pressure is applied by cylinders 96 to hold arms 95 against their stops. This approach eases starting the lamination process when one of the sheets is rather thick and relatively hard rolls are used. Image sheet 12 is then tucked into the nip below the array sheet, after which the rolls are rotated to proceed with the lamination. A feed rate of 5 to 15 feet per minute (1,524 to 4,572 mm per minute) is considered appropriate. Because array sheet 20 is supported on chute 120 as the sheet is drawn into the nip, the leading portion of the sheet is flexed or deformed away from image sheet 12 at the nip and wraps through a small angle into contact with roll 52. This deformation enlarges the nip angle between the two sheets. Image sheet 12 may be flexed similarly toward roll 54; however, this typically is not necessary. Most significantly, the geometric elements of the surface of sheet 20 which extend transverse to the direction of movement into the nip tend to straighten due to the deformation, thus ensuring full contact between the sheets and enabling air to escape from the interface at the nip. Thus, even with array sheets exhibiting considerable variations in thickness which could produce incomplete lamination due to pockets of entrapped air, the surface facing the image sheet is deformed according to our method sufficiently to permit air to escape. Sheets 12 and 20 may also be inserted into the nip with their leading edges aligned; however, this may result in somewhat poor lamination near the leading edges, which may require that the laminate be trimmed in such a way that the size of the completed product would be reduced.

After sheets 12, 20 have been laminated in accordance with our method using the apparatus of FIGS. 3 to 5, proper alignment of the image with the lenticules may be achieved at aligning station 56 with the apparatus 130 illustrated in FIGS. 6 to 16. A rigid base plate or mounting table 132 is provided with a rectangular opening 134 below which light source 58 is mounted, not illustrated in FIG. 6. Extended along a front edge of base plate 132 is a straight guide rail 136; and along a rear edge of base plate 132, a straight cam roll track 138. A rigid rectangular support frame 140 comprises an essentially horizontal front support plate 142, an essentially horizontal rear support plate 144 (shown exploded out of assembled position), an essentially vertical actuator support or left end plate 146 and an essentially vertical right end plate 148, all joined by suitable fasteners, not illustrated. A linear bearing 150 is mounted to the under side of front support plate 142 and rides on guide rail 136. A pair of cam roll support brackets 152, 154 are mounted at spaced locations along the rear edge of the under side of rear support plate 144, to support rollers 156 which ride in track 138. A conventional linear actuator mechanism 158 is mounted on an extension 160 of base plate 132 and includes an actuator shaft 162 operatively connected to support plate 146. Thus, mechanism 158 may be used to move frame 140 and its supported hardware along rail 136 and track 138 toward the right, as illustrated, to move back and forth beneath ultraviolet light source 62, as shown schematically in FIG. 2.

That is, mechanism 158, guide rail 136, cam roll track 138, linear bearing 150, brackets 152, 154 and rollers 156 provide a means for moving support frame 140 back and forth relative to source 58 and source 62.

Front mounting plate 142 includes a pair of rearwardly extended, horizontal mounting flanges 164, only one of which is visible in the FIGURES; and rear mounting plate 144, a pair of forwardly extended, horizontal mounting flanges 166. Each of mounting flanges 164, 166 has bolted to its under surface an L-shaped bracket 168 having a horizontal arm 170 abutting the mounting flange and a vertical leg 172. Mounted to the lower ends of legs 172 is a rectangular support frame 174, best seen in FIGS. 7 and 8, which also is attached to the lower margins of end plates 146, 148. A central opening 176 in frame 174 opens above opening 134 in base plate 132. Captured between the under sides of horizontal arms 170 and the upper surface of frame 174 is a rectangular gripper support frame 178 having a central opening 180. Hardened steel wear plates, not illustrated, may be provided between arms 170 and the upper surfaces of gripper support frame 178 and between the upper surfaces of frame 174 and the under surfaces of gripper support frame 178. A pair of linear actuators 182, 184 am mounted to support plate 146 and have output shafts 186, 188 which extend through holes 190, 192 in plate 146. As shown in FIG. 8, gripper support frame 178 includes on its left side near from support plate 142 a transversely projected pivot flange 194 which extends beneath actuator shaft 186. A bore in flange 194, not illustrated, rotatably receives the lower end of a pivot pin 196 which is fixedly mounted to actuator shaft 186 and extends downwardly to the bore in flange 194. At its left side near rear support plate 144, gripper support frame 178 includes a transversely projected flange 198 which extends beneath actuator shaft 188. An elongated slot 200 in flange 198 extends essentially parallel to end plate 146 and is sized to loosely receive a pivot and slide pin 202 which is fixedly mounted to actuator shaft 188 and extended downwardly into slot 200. Due to this arrangement, when actuators 182. 184 extend or retract shafts 186, 188 in the same direction at the stone speed, gripper support flange 178 will translate straight to the right or left above frame 174. But, when actuators 182, 184 extend or retract their shafts in different directions or at different speeds, or both, gripper support frame 178 will pivot or rotate about pin 196 and pin 202 will slide along slot 200.

Thus, flanges 194, 196; pins 196,202; slot 200; and actuator 182, 184 provide means for moving gripper support frame 178 by translating or rotating or both. Such translating and pivoting movement of frame 178 is used in our invention to accurately align sheets 12 and 20.

Figure 6:
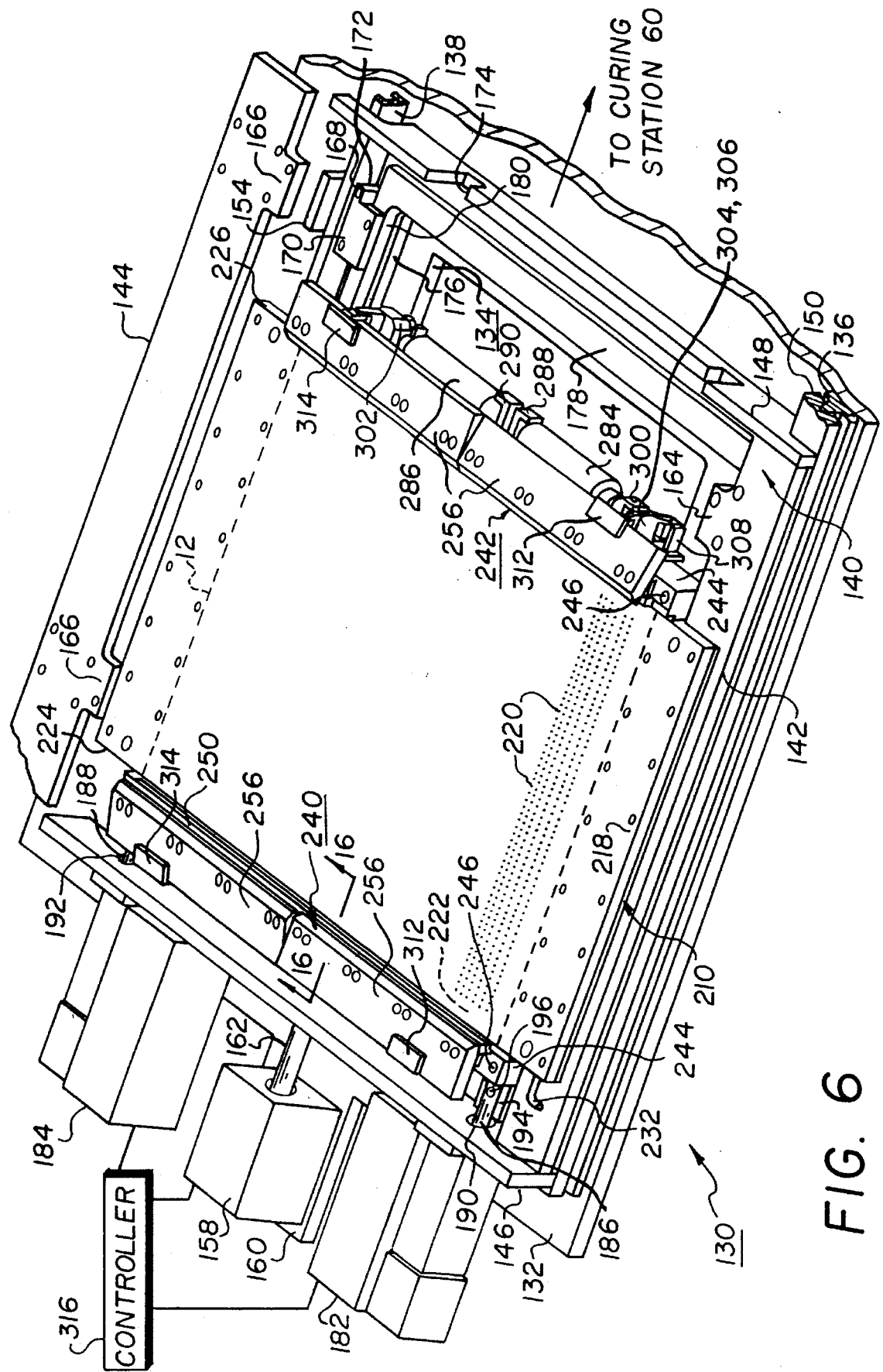
FIG. 6 illustrates a front perspective view, partially exploded, of the alignment apparatus according to our invention.
Figure 7:
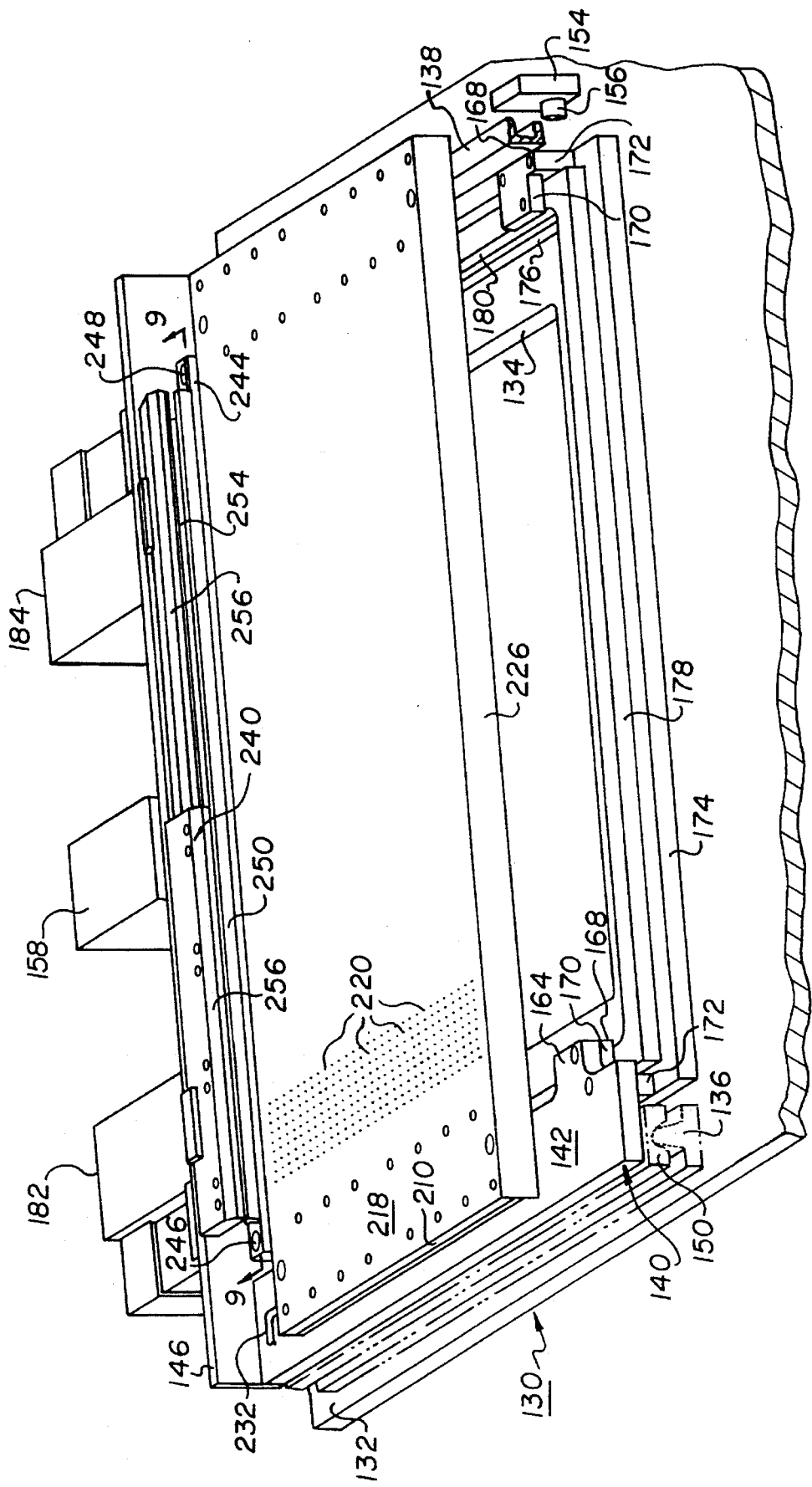
FIG. 7 illustrates a right side perspective view, partially exploded, of the apparatus of FIG. 6, with rear support plate 144, end plate 148 and gripper assembly 242 removed for ease of illustration.
Figure 8:
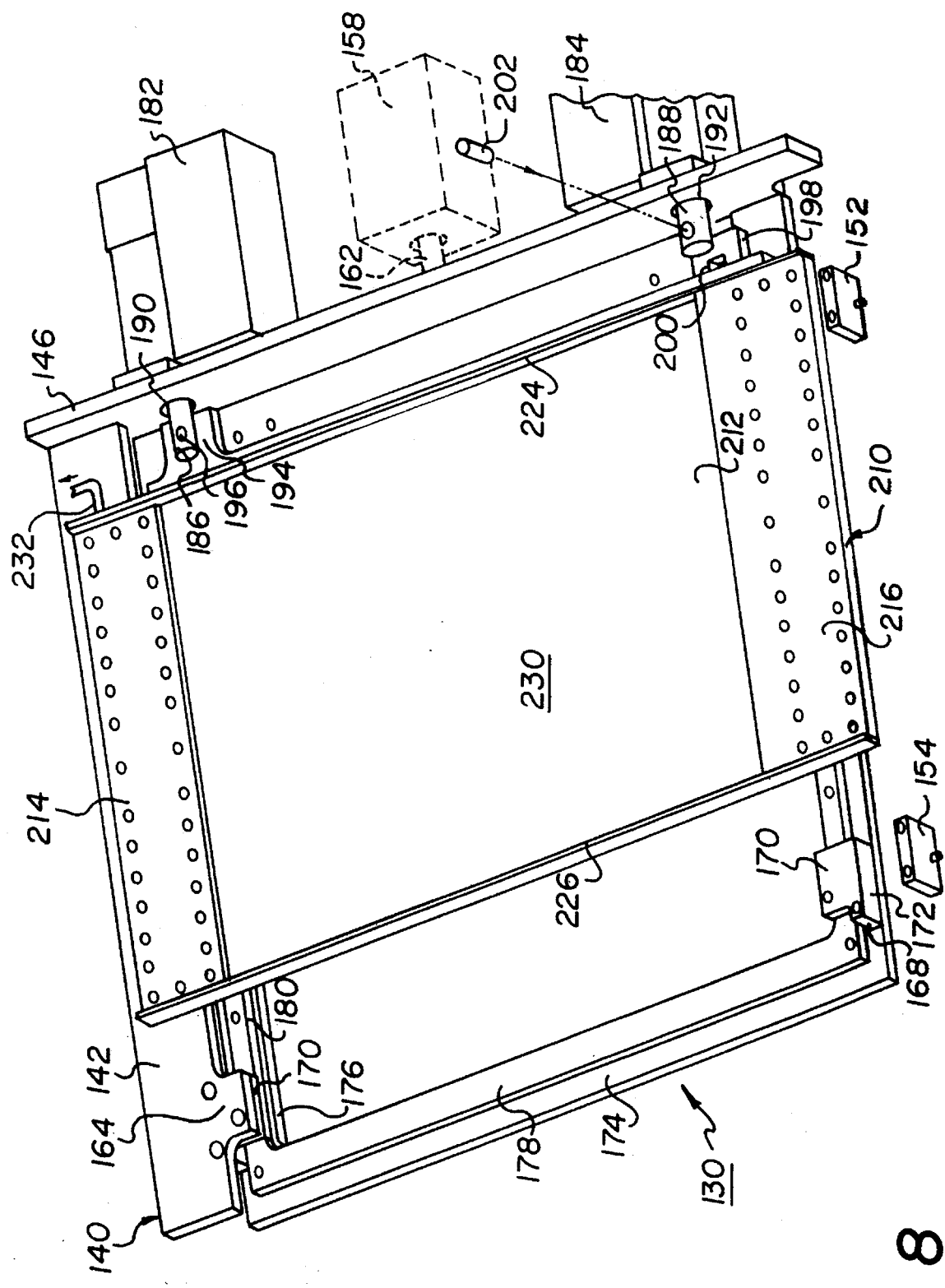
FIG. 8 illustrates a rear perspective view, partially exploded, of the apparatus of FIG. 6, with base plate 132, rear support plate 144, end plate 148, upper transparent plate 218 and gripper assemblies 240, 242 removed for ease of illustration.
Figure 9:
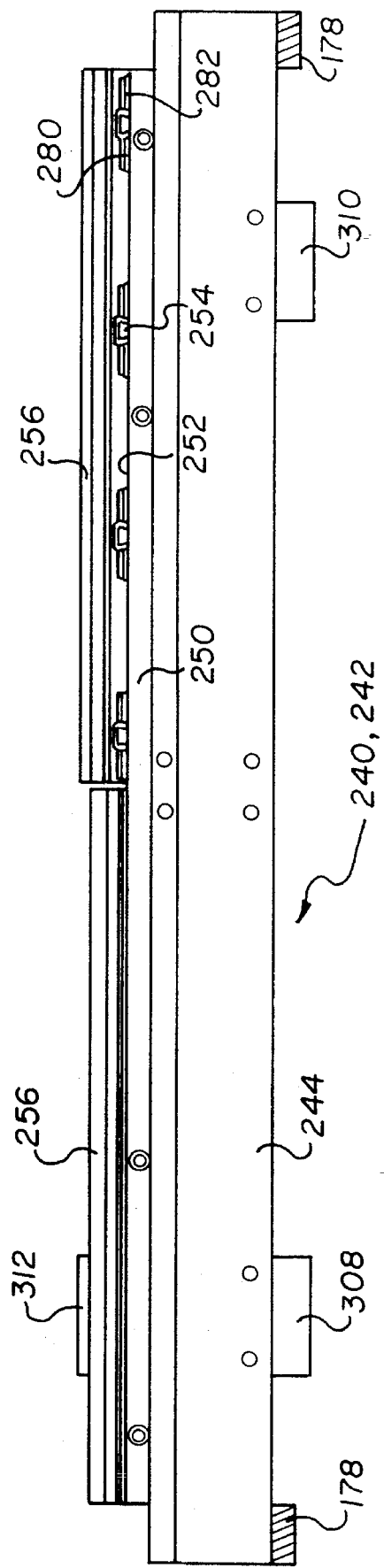
FIG. 9 illustrates a front view of gripper assembly 240 along line 9—9 of FIG. 7.
Figure 10:
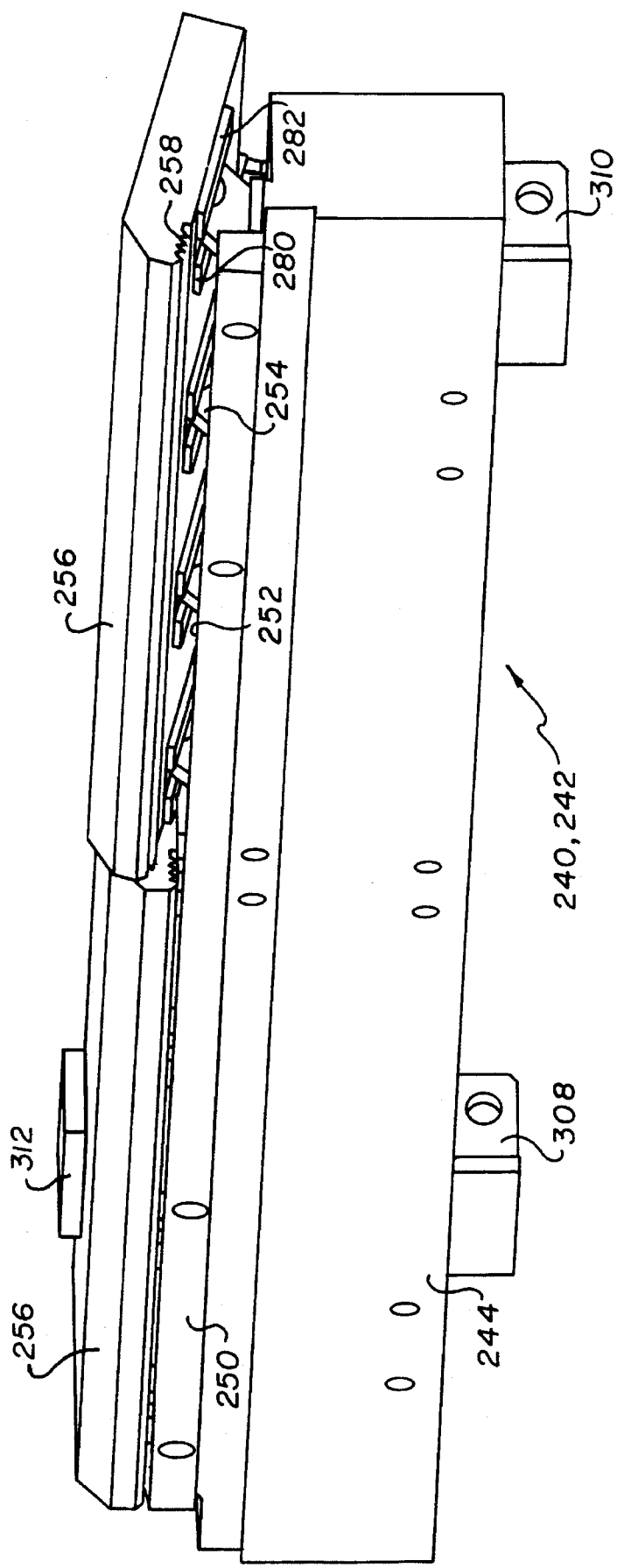
FIG. 10 illustrates a front perspective view of the assembly of FIG. 9.
Figure 16:
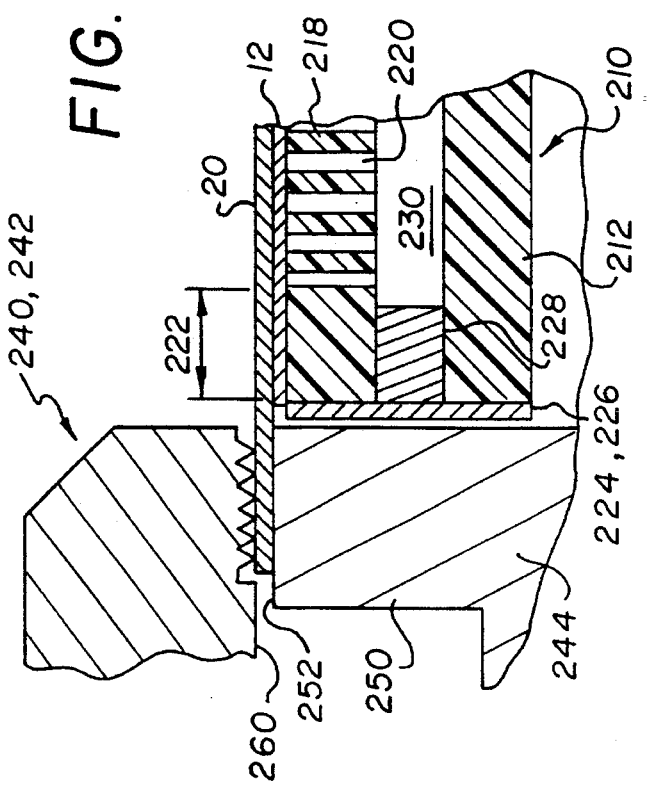
FIG. 16 illustrates a view along line 16—16 of FIG. 6.
Figure 15:
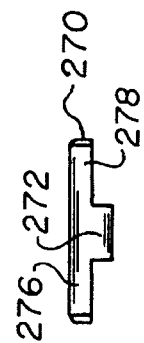
FIG. 15 illustrates an elevation view of a pivot pin for the gripper assemblies.
Figure 14:
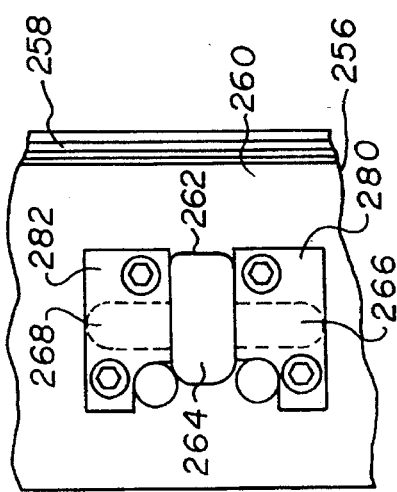
FIG. 14 illustrates a view along line 14—14 of FIG. 13, with pivot 254 and pivot pin 270 removed for ease of illustration.
Figure 13:
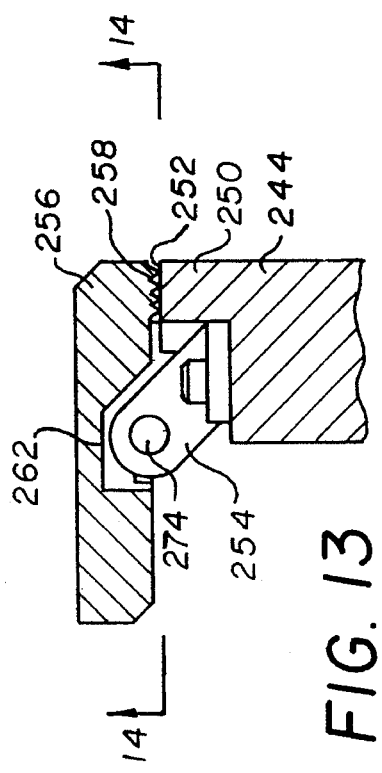
FIG. 13 illustrates a view along line 13—13 of FIG. 11.

As seen in FIGS. 6, 7, 8 and 16, a vacuum platen assembly 210 is mounted between front and rear support plates 142, 144. Assembly 210 comprises a lower, rectangular transparent plate 212, a pair of front and rear spacer plates 214, 216 and an upper, rectangular transparent plate 218. A rectangular pattern of openings 220 is provided through plate 218. Only a narrow strip of he patternn is shown in FIGS. 6 and 7, it being understood that the size of the pattern would depend on the size of the particular image sheet. The pattern is sized to permit sheet 12 to be placed on the upper surface of plate 218 with at least one edge margin 222 of sheet 12 extending beyond the pattern. See FIG. 16. Typically, such a margin 222 would be provided on both opposite edges of sheet 12 to permit the opposite edges of the image sheet to flex without delaminating when the edges of the array sheet are gripped during alignment. Because margin 222 can flex, it can conform readily to variations in the geometry of the array sheet and to misaligmnents between the platen and an anvil flange 250 to be described subsequently. A pair of vertical side wall plates 224, 226 extend between transparent plates 212, 218. Side spacers 228 also may be provided between the transparent plates, as shown in FIG. 16. The combination of transparent plates, spacer plates and side wall plates thus defines an internal vacuum plenum 230 which is connected to a suitable source of subatmospheric pressure by a conduit 232 which extends through front spacer plate 214 to plenum 230.

Thus, plenum 230, conduit 232 and the source provide a means for applying vacuum through the pattern of openings 220.

As shown in FIGS. 6, 7 and 9 to 15, left and right gripper assemblies 240, 242 are mounted to gripper support frame 178 on either side of vacuum platen assembly 210. Gripper assembly 240 typically would remain mounted to the left end of frame 178, while gripper assembly 242 would be positioned along frame 178 at a location appropriate for the width of vacuum platen assembly 210. The gripper assemblies are identical. Similar grippers could also be provided for the front and back edges of the array sheet. Each comprises an elongated gripper base member 244 which extends between the front and rear sparts of frame 178. At its ends, member 244 is provided with bores 246, 248 for mounting bolts to secure the member to frame 178. Along its top surface, member 244 comprises an upwardly extended anvil flange 250 having an essentially flat upper surface 252 on which an edge of array sheet 20 is placed, as seen best in FIG. 16. Preferably, surface 252 and the upper surface of image sheet 12 are coplanar. Behind anvil 250, a plurality of angled pivot members 254 are mounted to pivotably support a pair of elongated clamping plates 256. Two clamping plates are illustrated for each gripper assembly; however, a single clamping plate or additional clamping plates also could be used. On their under surfaces above anvil 250, clamping plates 256 include grooved or knurled surfaces 258 tar ensuring good mechanical engagement with array sheet 20. On their under surfaces 260, clamping plates 256 are provided with pockets or recesses 262 having a central portion 264 sized to receive the tip of one of pivot members 254 and a pair of cylindrical-bottomed side portions 266, 268 sized to receive a pivot pin 270. The central portion 272 of pin 270 is cylindrical and sized to be rotatably received in a bore 274 in pivot member 254. The half-cylindrical end portions 276, 278 of pin 270 are sized to be received in side portions 266, 268. Pin 270 is placed through bore 274 and the combination is inserted into pocket 262 with end portions 276, 278 mating with side portions 266, 268. A pair of keeper plates 280,282 retain pin 270 within pocket 262 to complete the pivot connection.

Figure 11:
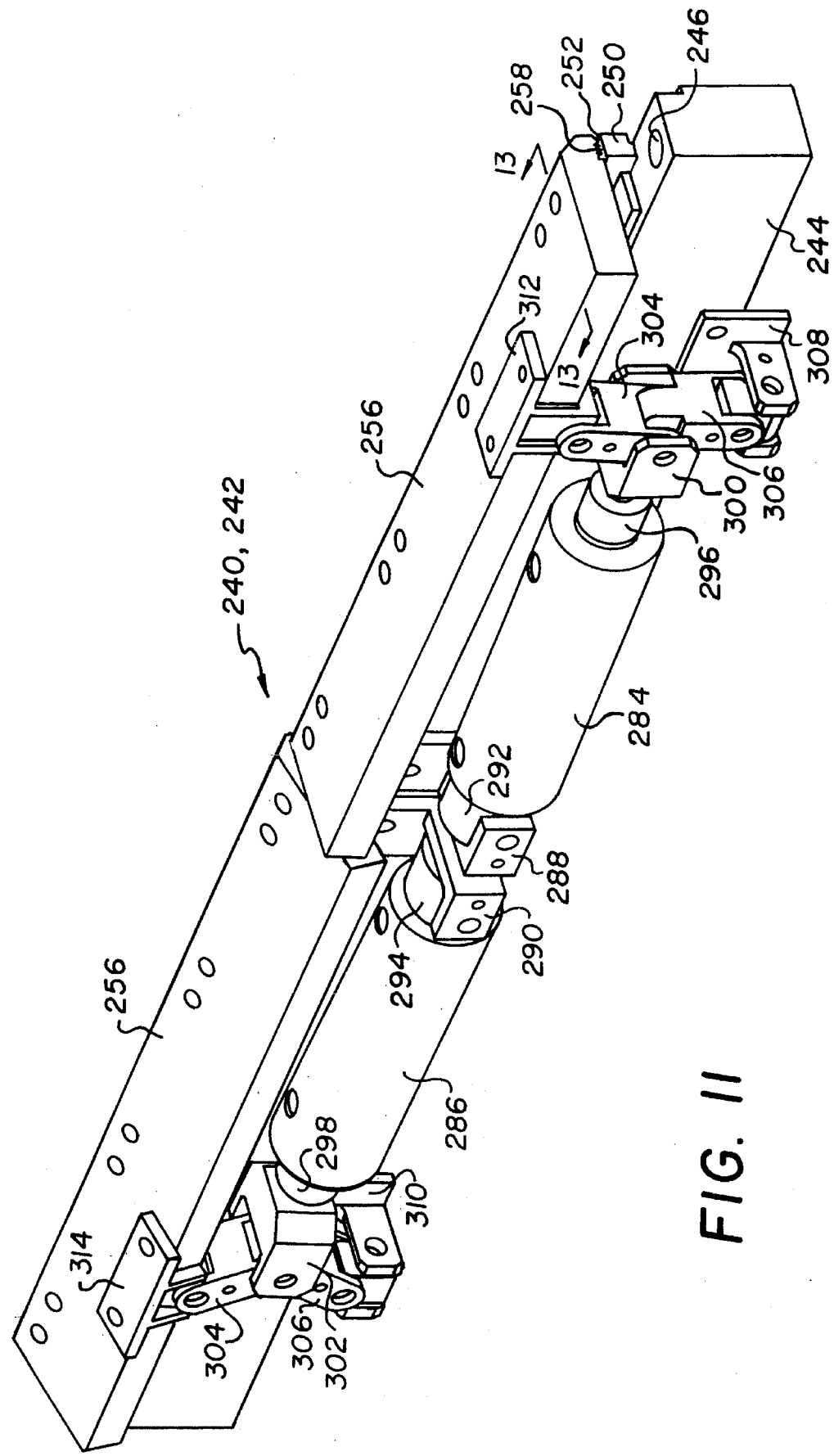
FIG. 11 illustrates a rear perspective view of the assembly of FIG. 9.
Figure 12:
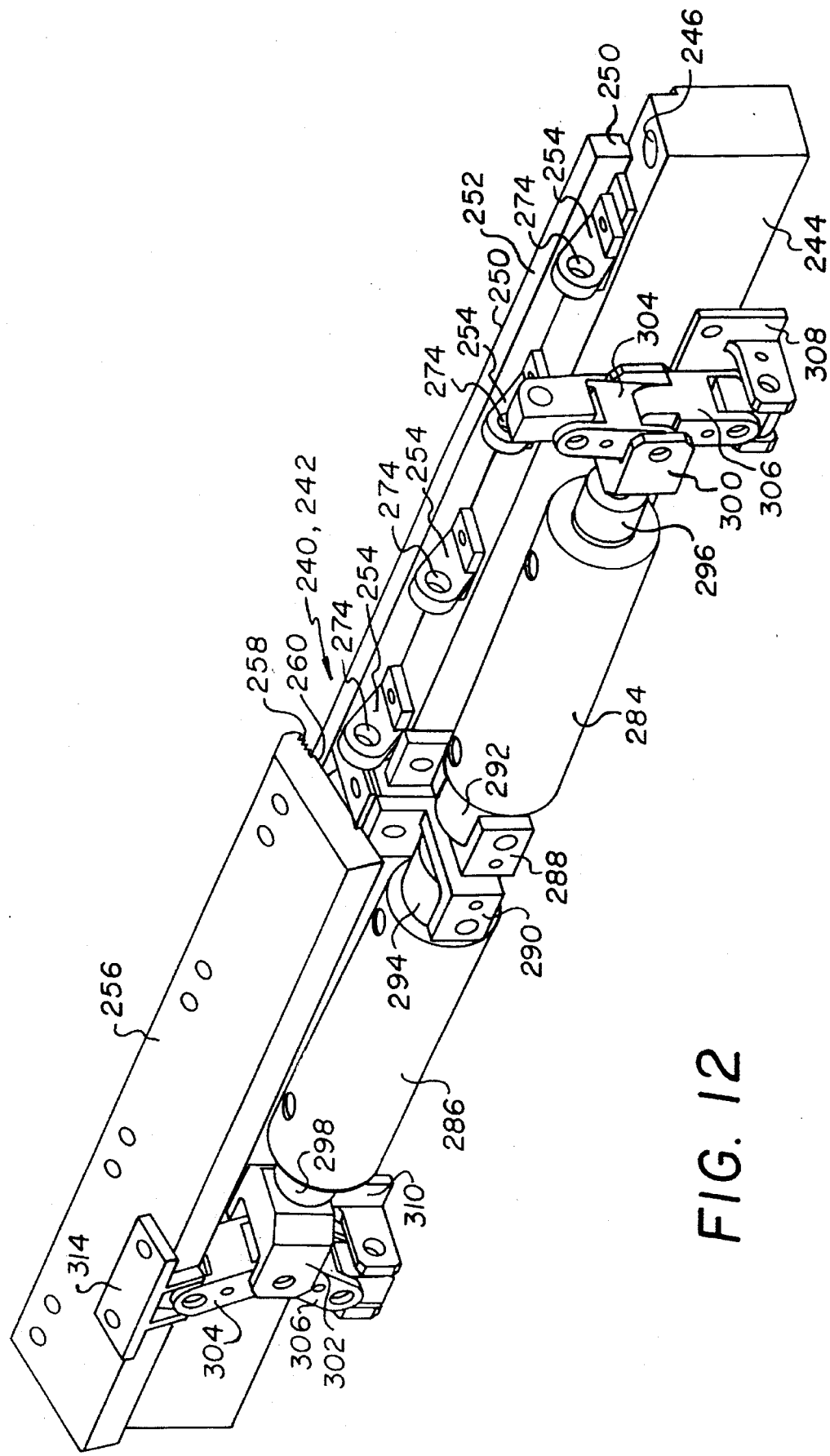
FIG. 12 illustrates a rear perspective view of the assembly of FIG. 9, with one of clamping plates 256 removed for ease of illustration.

Clamping plates 256 are moved between the open and closed positions illustrated in FIGS. 6, 7 and 9 to 12 using the actuator mechanism illustrated in FIGS. 11 and 12. In these figures, the various fasteners and pivot pins have not all been illustrated; however, those skilled in the art will understand where they are to be provided, without further elaboration in this description. A pair of pneumatic actuators 284, 286 are mounted to the back side of base member 244 by a pair of centrally to mounted pivot brackets 288, 290 which pivotably support the head ends 292, 294 of the actuators. The rods 296, 298 of the actuators are provided with clevises 300, 302 each of which pivotably supports a pair of toggle links 304, 306. A pair of pivot brackets 308, 310 are mounted to base member 244 and are pivotably connected to links 306. A pair of pivot brackets 312, 314 are mounted to clamping plates 256 and pivotably connected to links 304. Thus, when actuators 284, 286 extend rods 296,298, clamping members 256 pivot downward to grip the edges of array sheet 20 as indicated in FIG. 16; and when the rods are withdrawn, clamping members 256 pivot upward to release the edges of array sheet 20. Those skilled in the an will appreciate that a conventional programmable controller 316, illustrated schematically in FIG. 6, may be used to govern to operations of the various actuators, or the operator may operate the actuators independently.

Thus, the assembly of elements 244 to 314 provides a means for gripping an edge of array sheet 20. And, upon actuation of the previously described means for moving gripper support frame 178, on which the means for gripping is mounted, the array sheet will move on the layer of uncured adhesive and relative to the image sheet. As mentioned previously in the summary of our invention, at least one edge of array sheet 20 needs to be gripped to permit alignment of the array and image sheet.

In use of the apparatus of FIGS. 6 to 16, the lamination produced at station 50 is placed on vacuum platen assembly 210 with the side edges of array sheet 20 extending over anvils 250 as shown in FIG. 16. Vacuum is applied to plenum 230 to hold image sheet 12 securely, except along its edges next to anvils 250. Actuators 284, 286 are operated to extend their rods and pivot clamping members 256 to their closed positions, thus securely gripping array sheet 20. The edges of the image sheet are free to flex somewhat, thus preventing delamination. The operator then observes the degree of misalignment between the image lines and the lenticules and operates actuators 182, 184 as necessary to move gripper support frame 178, gripper assemblies 240, 242 and the array sheet until proper alignment is achieved. With the edges of the array sheet still clamped and the image sheet held fast by the vacuum platen assembly, actuator 158 is operated to move frame 140 and its attached hardware along rail 136 and track 138, completely beneath and past ultraviolet light source 62 and then back to the position of FIG. 6. Only a few seconds exposure to ultraviolet light is required to cure layer 18 of adhesive 48 of the type previously described. The adhesive is cured during this dual pass beneath the light source. A single pass at higher power or lower speed also may be used. The gripper assemblies and the vacuum are then released, permitting the completed depth image system to be removed from the vacuum platen assembly. After trimming of the edges of the array sheet in any convenient manner, the product is ready for market.

PARTS LIST

10 . . . depth image system
12 . . . image sheet or medium
12' . . . leading edge of image sheet 12
14 . . . set of image lines
16 . . . image lines
18 . . . layer of adhesive
20 . . . lenticular array sheet
20' . . . leading edge of array sheet 20
22 . . . parallel lenticules
24, 26 . . . eyes of observer
28, 30, 32, 34, 36, 38 . . . light rays
40 . . . gravure coating station
42 . . . gravure roll
44 . . . pressure roll
46 . . . pan
48 . . . ultraviolet curable adhesive
50 . . . laminating station
52 . . . movable nip roll
54 . . . fixed nip roll
56 . . . aligning station
58 . . . visible light source
60 . . . curing station
62 . . . ultraviolet light source
64 . . . axis parallel to lenticules 22
70 . . . base plate
72, 74 . . . upstanding end plate
76 . . . cross bar
78 . . . projecting flange
80, 82 . . . bearing for roll 54
84 . . . C-shaped notch in end plates 72, 74
86 . . . outboard bearing plate
88 . . . inboard beating plate
90 . . . pivot shaft
92, 94 . . . bell crank
93 . . . upwardly extended arm of bell cranks 92, 94
95 . . . horizontally extended arm of bell cranks 92, 94
96 . . . pneumatic cylinder
98 . . . rod
100 . . . bore in end plates 72, 74
102 . . . pivot joint to bell cranks 92, 94
104 . . . drive pinion for roll 52
106 . . . drive pinion for roll 54
108, 110 . . . support plates
112, 114, 116 . . . pairs of support stands
118 . . . infeed chute for image sheet 12
120 . . . infeed chute for array sheet 20
α . . . angle between chutes 12 and 20
β . . . nip angle between sheets 12, 20
122, 124 . . . outfeed chutes for laminates
130 . . . apparatus for aligning image sheet 12 and array sheet 20
132 . . . base plate or mounting table
134 . . . rectangular opening in base plate 132
136 . . . guide rail
138 . . . cam roller track
140 . . . rectangular support frame
142 . . . front support plate
144 . . . rear support plate
146 . . . actuator support or left end plate
148 . . . right end plate
150 . . . linear bearing to ride on rail 136
152, 154 . . . roller support brackets
156 . . . roller to ride in track 138
158 . . . actuator
160 . . . extension of base plate 132
162 . . . actuator shaft of actuator 158
164 . . . front mounting flange
166 . . . rear mounting flange
168 . . . L-shaped bracket
170 . . . horizontal arm
172 . . . vertical leg
174 . . . rectangular frame
176 . . . central opening in frame 174
178 . . . rectangular gripper support frame
180 . . . central opening in support frame 178
182, 184 . . . linear actuators
186, 188 . . . output shafts of actuators 182, 184
190, 192 . . . holes in end plate 146 for shafts 186, 188
194 . . . transversely projecting pivot flange
196 . . . pivot pin
198 . . . transversely projecting pivot flange
200 . . . slot in flange 198
202 . . . pivot and slide pin
210 . . . vacuum platen assembly
212 . . . lower transparent plate
214 . . . front spacer plate
216 . . . rear spacer plate
218 . . . upper transparent plate
220 . . . pattern of openings through plate 218
222 . . . edge margin of image sheet 12 extended beyond pattern 220
224, 226 . . . side wall plates
228 . . . side spacer
230 . . . vacuum plenum
232 . . . conduit through front spacer plate into plenum 230
240 . . . left gripper assembly
242 . . . right gripper assembly
244 . . . elongated gripper base member
246, 248 . . . bores for mounting bolts to gripper support frame 178
250 . . . elongate anvil
252 . . . upper surface on anvil 250
254 . . . angled pivots
256 . . . elongated clamping or gripping plates
258 . . . grooved or knurled surface
260 . . . underside of plate 256
262 . . . pocket in plate 256
264 . . . central portion of pocket 262
266, 268 . . . cylindrical-bottomed side portions of pocket 262
270 . . . pivot pin
272 . . . central cylindrical portion of pin 270
274 . . . bore in pivot 254
276, 278 . . . half cylindrical end portions of pin 270
280, 282 . . . keeper plates for pin 270
284, 286 . . . pneumatic actuators
288, 290 . . . pivot brackets
292, 294 . . . head ends of actuators 284, 286
296, 298 . . . rods of actuators 284, 286
300, 302 . . . clevises 304, 306 . . . toggle links
308, 310 . . . pivot brackets to connect links 304 to base member 244
312, 314 . . . pivot brackets to connect links 306 to gripping plates 256
316 . . . controller While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for aligning a depth image system of the type including an image sheet bearing a lineiform image; a lenticular array sheet, the array sheet having lenticules parallel to the lineiform image and the array sheet having at least one edge extending laterally beyond at least one edge of the image sheet; and a layer of uncured but radiation-curable adhesive between the image and array sheets, the apparatus comprising:

a vacuum platen for supporting the image sheet with the array sheet laminated thereto by the layer of uncured adhesive, the platen having a first surface with a pattern of openings, the pattern having a geometry such that the at least one edge of the image sheet extends beyond the pattern when the image sheet is supported on the vacuum platen;

means for applying vacuum through the pattern to hold the image sheet on the first surface;

means for gripping the at least one edge of the array sheet and, while gripping the at least one edge, for translating and/or rotating the array sheet on the layer of uncured adhesive and relative to the image sheet to align the lenticular array with the lineiform image; and means for curing the adhesive following alignment of the array and image.

2. Apparatus according to claim 1, wherein the means for curing comprises a source of ultraviolet light.

3. Apparatus according to claim 2, wherein the ultraviolet light is directed through the array sheet.

4. Apparatus according to claim 2, wherein the source of ultraviolet light has a longitudinal axis essentially parallel to the lenticules, further comprising means for moving the vacuum platen and the means for gripping past the ultraviolet light source.

5. Apparatus according to claim 4, wherein the means for moving the vacuum platen moves the platen and the means for gripping past the ultraviolet source in a first direction and thereafter moves them past in a second, opposite direction.

6. Apparatus according to claim 1, wherein the means for curing comprises an electron beam source.

7. Apparatus according to claim 6, wherein the electron beam is directed through the image sheet.

8. Apparatus according to claim 1, wherein the means for gripping and translating and/or rotating comprises:

means for gripping the at least one edge of the array sheet;

a gripper support frame member supporting the means for gripping; and means for translating and/or rotating the gripper support frame member to reposition the array sheet with the lenticules in alignment with the lineiform image.

9. Apparatus according to claim 1, wherein the vacuum platen permits the at least one edge of the image sheet to flex when the means for gripping moves the at least one edge of the array sheet.

10. Apparatus according to claim 1, wherein the means for gripping grips two opposite edges of the array sheet.

11. A method for aligning a depth image system of the type including an image sheet bearing a lineiform image; a lenticular array sheet, the array sheet having lenticules parallel to the lineiform image and the array sheet having at least one edge extending laterally beyond at least one edge of the image sheet; and a layer of uncured but radiation-curable adhesive between the image and array sheets, the method comprising the steps of:

providing a vacuum platen for supporting the image sheet, the platen having a first surface with a pattern of openings;

placing the image sheet on the vacuum platen with the array sheet laminated thereto by the layer of uncured adhesive and with the at least one edge of the image sheet extended beyond the pattern;

applying vacuum through the pattern to hold the image sheet on the vacuum platen;

gripping the at least one edge of the array sheet and translating and/or rotating the array sheet on the layer of uncured adhesive and relative to the image sheet to align the lenticular array with the lineiform image; and curing the adhesive following alignment of the array and image.

12. A method according to claim 11, further comprising the step of trimming the array sheet to congruency with the image sheet.

13. A method according to claim 11, wherein the curing is completed using a source of ultraviolet light.

14. A method according to claim 13, wherein the ultraviolet light is directed through the array sheet.

15. A method according to claim 13, wherein the source of ultraviolet light has a longitudinal axis essentially parallel to the lenticules, further comprising the step of moving the vacuum platen past the ultraviolet light source while holding the image sheet and gripping the array sheet.

16. A method according to claim 15, wherein the moving step moves the platen past the ultraviolet source in a first direction and thereafter moves the platen past in a second, opposite direction.

17. A method according to claim 11, wherein the curing step is completed using an electron beam source.

* * * * *